United States Patent
Terao et al.

(10) Patent No.: US 8,770,056 B2
(45) Date of Patent: Jul. 8, 2014

(54) JOYSTICK DEVICE

(75) Inventors: Takanori Terao, Tsurugashima (JP); Satoru Nakagawa, Tsurugashima (JP); Hideaki Ito, Tsurugashima (JP)

(73) Assignee: Toyo Denso Co., Ltd., Tokyo (JP)

( * ) Notice: Subject to any disclaimer, the term of this patent is extended or adjusted under 35 U.S.C. 154(b) by 283 days.

(21) Appl. No.: 13/443,051

(22) Filed: Apr. 10, 2012

(65) Prior Publication Data

US 2012/0260760 A1    Oct. 18, 2012

(30) Foreign Application Priority Data

Apr. 12, 2011 (JP) ................................. 2011-088064

(51) Int. Cl.
*G05G 9/047*    (2006.01)
(52) U.S. Cl.
CPC .................................... *G05G 9/047* (2013.01)
USPC ...................................... 74/471 XY; 335/205
(58) Field of Classification Search
CPC ..................................................... G05G 9/047
USPC ........................................... 335/205; 345/161
See application file for complete search history.

(56) References Cited

U.S. PATENT DOCUMENTS

| | | | | |
|---|---|---|---|---|
| 3,818,154 A | * | 6/1974 | Presentey ................. | 74/471 XY |
| 4,849,583 A | * | 7/1989 | Meyer ...................... | 74/471 XY |
| 5,160,918 A | * | 11/1992 | Saposnik et al. ............. | 345/161 |
| 6,175,233 B1 | | 1/2001 | McCurley et al. | |
| 7,654,670 B2 | * | 2/2010 | Mimura ......................... | 351/208 |
| 8,578,808 B2 | * | 11/2013 | Koitabashi ............... | 74/471 XY |
| 2003/0137394 A1 | | 7/2003 | Romero Herrera et al. | |
| 2006/0117894 A1 | | 6/2006 | Sawada et al. | |
| 2008/0225002 A1 | | 9/2008 | Weppenaar | |
| 2008/0249668 A1 | | 10/2008 | Miyata et al. | |
| 2009/0000413 A1 | | 1/2009 | Furhoff et al. | |
| 2009/0084214 A1 | | 4/2009 | Sakai et al. | |

FOREIGN PATENT DOCUMENTS

| | | |
|---|---|---|
| CN | 101284510 A | 10/2008 |
| CN | 101341357 A | 1/2009 |
| DE | 10 2008 013 280 A1 | 9/2008 |
| EP | 2 023 359 A1 | 2/2009 |
| GB | 2 450 342 A | 12/2008 |
| JP | 2007323859 A | 12/2007 |
| WO | 00/26891 A1 | 5/2000 |

* cited by examiner

*Primary Examiner* — William C Joyce
(74) *Attorney, Agent, or Firm* — Carrier Blackman & Associates, P.C.; Joseph P. Carrier; William D. Blackman (57) ABSTRACT

In a joystick device where a tilting operation direction of an operation shaft is detected based on positional change of a magnet relative to a magnetic sensor, the magnet being moved with tilting of the operation shaft, a slider is arranged between a base facing a board fixed to a case and a magnet holder to which the operation shaft is swingably coupled; the magnet holder is joined to the slider such that the slider guides relative movement of the holder in a first linear direction orthogonal to the axis of the operation shaft but prevents relative movement of the holder in a second linear direction orthogonal to the first direction; and a guide mechanism configured to guide movement of the slider in the second direction is provided between the slider and the base. This prevents variation in the detection accuracy regardless of tilting of the shaft.

1 Claim, 11 Drawing Sheets

FIG.11

JOYSTICK DEVICE

BACKGROUND OF THE INVENTION

1. Field of the Invention

The present invention relates to a joystick device comprising: an operation knob; an operation shaft coupled to the operation knob on one end thereof; a case supporting the operation shaft while allowing the operation shaft to tilt from a neutral position about a tilting center set on an axis of the operation shaft; a magnetic sensor provided on a board fixed to the case; a magnet arranged to face the magnetic sensor in such a manner as to move in accordance with the tilting of the operation shaft, in which a tilting operation direction of the operation shaft is detected based on positional change of the magnet relative to the magnetic sensor.

2. Description of the Related Art

Japanese Patent Application Laid-open No. 2007-323859, for example, discloses a joystick device in which an operation knob is provided on one end of an operation shaft, and a magnet is provided on the other end of the operation shaft in such a manner as to face a magnetic sensor provided on a board.

However, in the joystick device disclosed in Japanese Patent Application Laid-open No. 2007-323859, a distance between the magnet and the magnetic sensor changes depending on the tilting of the operation shaft. The change causes variation in the detection accuracy, and a function of correcting the variation is required for circuits.

SUMMARY OF THE INVENTION

The present invention has been made in view of such circumstances. An object of the invention is to provide a joystick device capable of preventing variation in the detection accuracy by keeping constant a distance between a magnet and a magnetic sensor regardless of the tilting of an operation shaft.

In order to achieve the object, according to an aspect of the present invention, there is provided a joystick device comprising: an operation knob; an operation shaft coupled to the operation knob on one end thereof; a case supporting the operation shaft while allowing the operation shaft to tilt from a neutral position about a tilting center set on an axis of the operation shaft; a magnetic sensor provided on a board fixed to the case; a magnet arranged to face the magnetic sensor in such a manner as to move in accordance with the tilting of the operation shaft, in which a tilting operation direction of the operation shaft is detected based on positional change of the magnet relative to the magnetic sensor, wherein the board is fixed to the case in such a manner as to extend along a plane including a first linear direction and a second linear direction, the first linear direction being orthogonal to an axis of the operation shaft placed at the neutral position, the second linear direction being orthogonal to the axis of the operation shaft placed at the neutral position and to the first linear direction, a base is fixed to the case, the base facing the board and including a first opening portion which the magnetic sensor provided on the board faces, the magnet is fixed to a holding protruding portion which is provided on a magnet holder and is inserted into the first opening portion, the other end of the operation shaft being swingably coupled to the magnet holder, a slider is arranged between the magnet holder and the base, the slider including a second opening portion into which the holding protruding portion is inserted, the magnet holder is joined to the slider such that the slider guides relative movement of the magnet holder in the first linear direction but prevents relative movement of the magnet holder in the second linear direction, and a guide mechanism configured to guide a movement of the slider in the second linear direction is provided between the slider and the base.

According to the aforementioned configuration of the present invention, the base facing the board being along the plane including the first linear direction and the second linear direction is fixed on the case, the first linear direction being orthogonal to the axis of the operation shaft placed at the neutral position, the second linear direction being orthogonal to the axis of the operation shaft placed at the neutral position and to the first line direction. The magnet is fixed in the magnet holder to which the other end of the operation shaft is swingably coupled. The slider is arranged between the magnet holder and the base. The magnet holder is coupled to the slider so that the relative movement of the magnet holder in the first linear direction can be guided and the relative movement of the magnet holder in the second linear direction can be prevented. The guide mechanism configured to guide the movement of the slider in the second linear direction is provided between the slider and the base. This configuration makes it possible to make the magnet holder move along the plane parallel to the board in accordance with the tilting of the operation shaft and thus possible to keep constant a distance between the magnet and the magnetic sensor regardless of the tilting position of the operation shaft. Thus, it is possible to prevent variation in the detection accuracy and also possible to simplify the configuration of circuits to thereby achieve cost reduction. In addition, preventing the variation of the detection accuracy makes it possible to control a movement amount of the cursor in very small steps (linearly) in accordance with change of a tilting amount of the operation knob.

Here, a second board 61 of an embodiment corresponds to the board of the present invention; a first magnet 65 of the embodiment corresponds to the magnet of the present invention; and a first magnetic sensor 66 of the embodiment corresponds to the magnetic sensor of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below while referring to the attached FIGS. 1 to 11.

Figure 1:
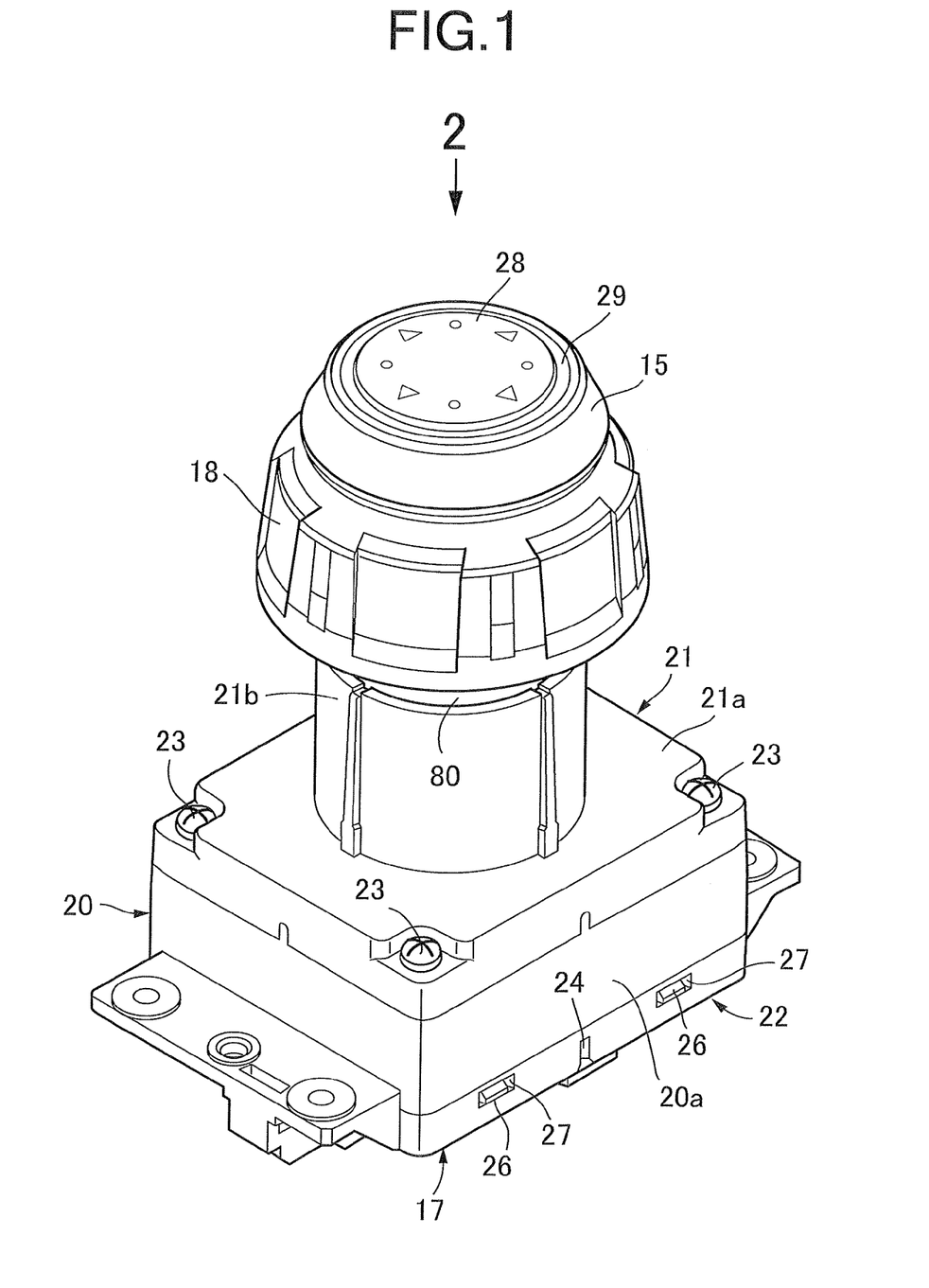
FIG. 1 is a perspective view of a whole joystick device.
Figure 2:
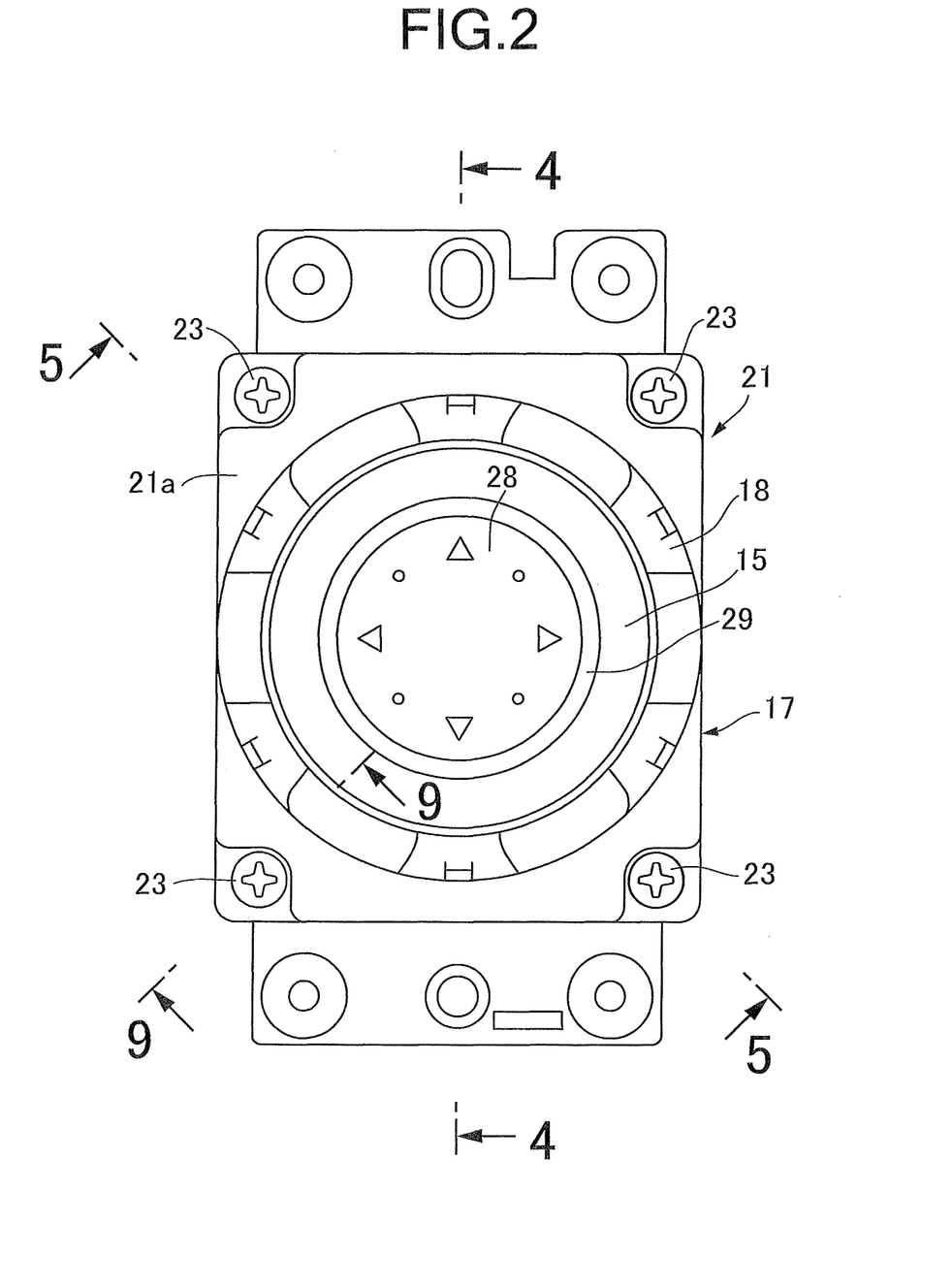
FIG. 2 is a view seen from a direction of an arrow 2 in FIG. 1.
Figure 3:
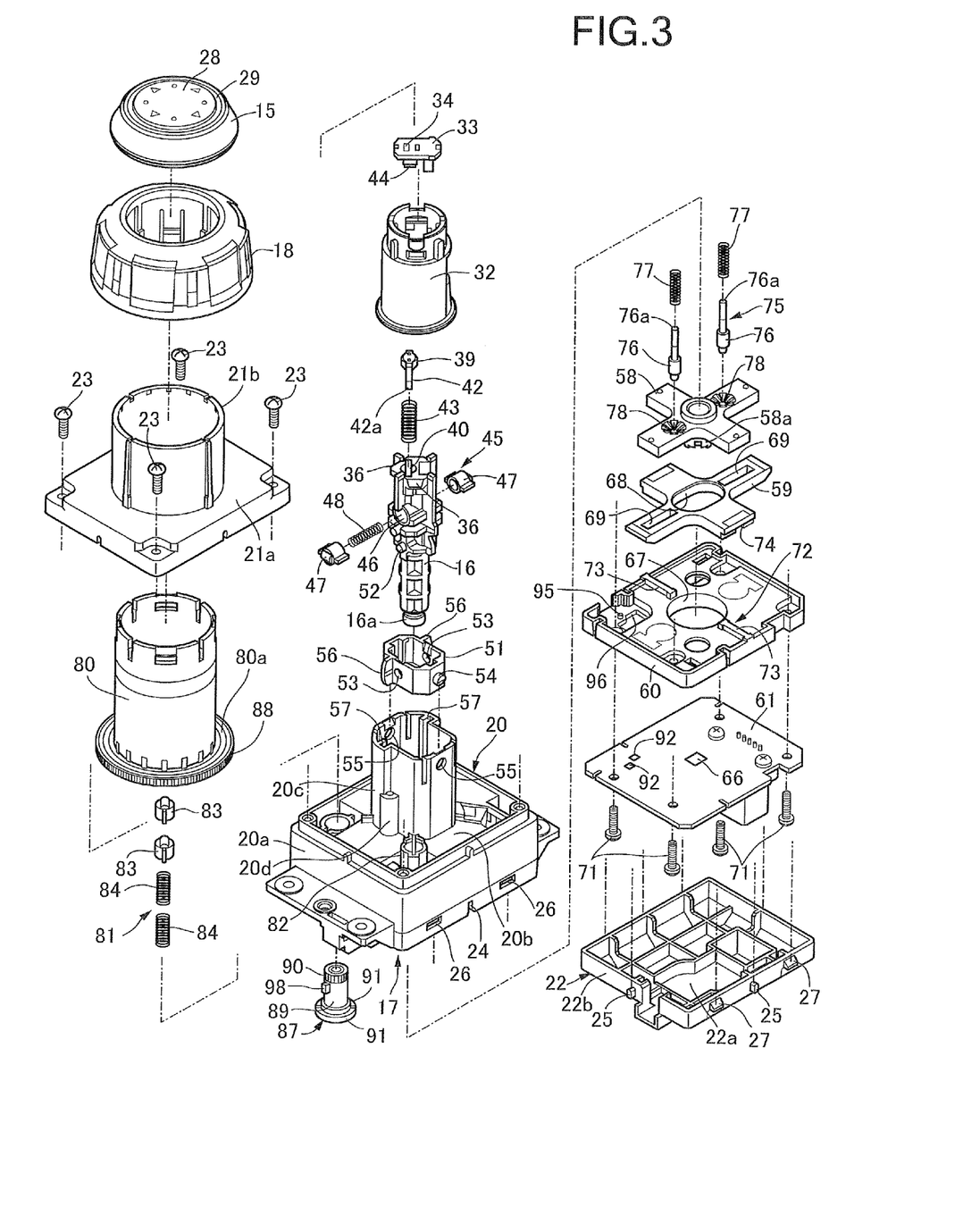
FIG. 3 is an exploded perspective view of the joystick device.

First, FIGS. 1 to 3 show a joystick device used for a cursor operation on a screen of a car navigation system, for example. The joystick device includes an operation knob 15, an operation shaft 16, a case 17, and a dial knob 18. The operation shaft 16 is coupled to the operation knob 15 on its one end. The case 17 tiltably supports the operation shaft 16. The dial knob 18 is arranged at a position adjacent to the operation knob 15 to be rotatable around an axis of the operation shaft 16.

Figure 4:
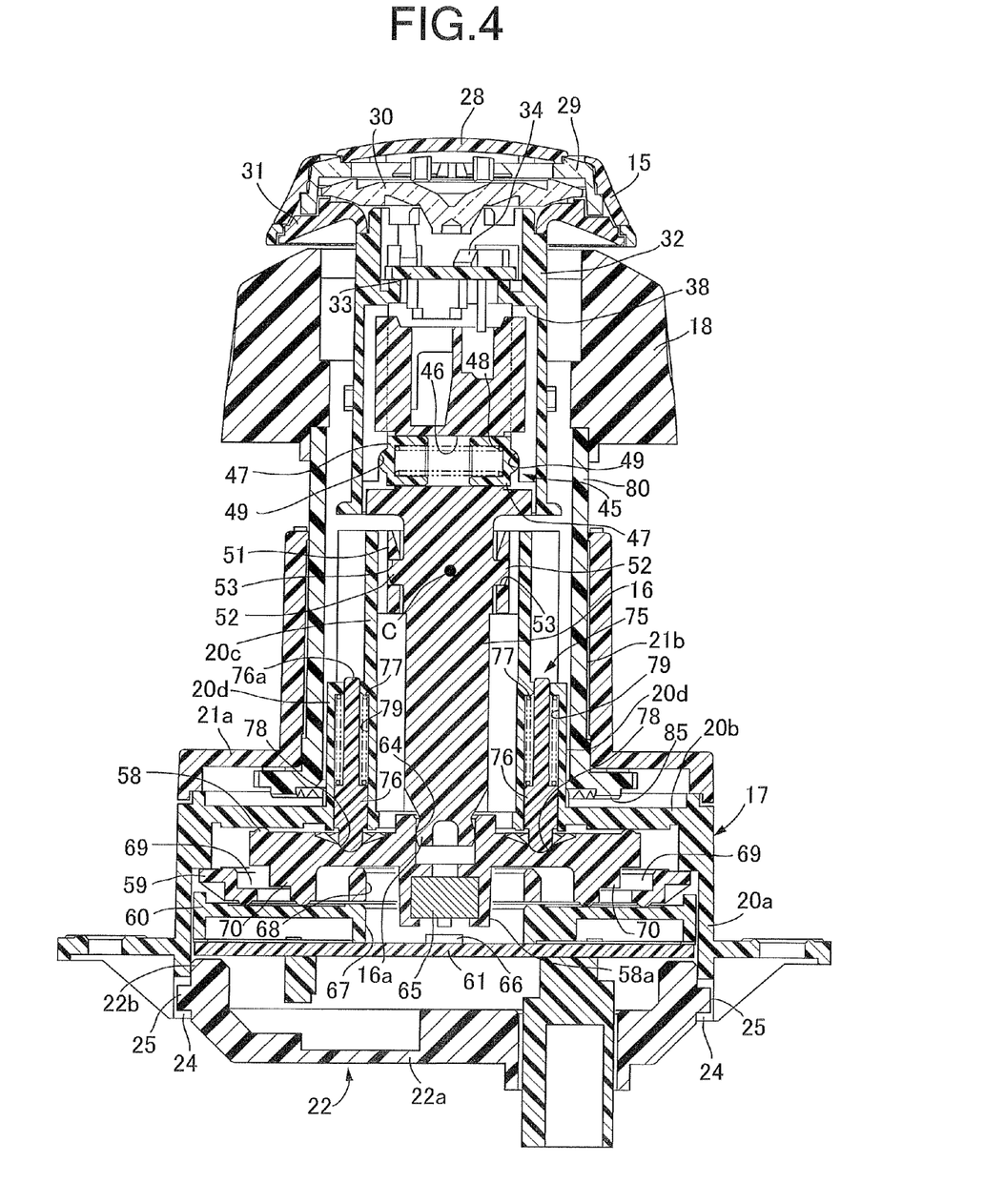
FIG. 4 is a sectional view taken along a line 4-4 in FIG. 2.

Referring to FIG. 4 together, the case 17 includes a case main body 20, a first lid member 21, and a second lid member 22. The first lid member 21 is fastened to the case main body 20 with multiple screw members 23. The second lid member 22 is joined to the case main body 20 on the opposite side of the case main body 20 from the first lid member 21.

The case main body 20 integrally includes a tubular side-wall portion 20a, a support wall portion 20b, and an inner tubular support portion 20c. The tubular side-wall portion 20a is formed into a rectangular tubular shape. The support wall portion 20b extends inward from an inner surface closer to one end of the tubular side-wall portion 20a. The inner tubular support portion 20c is perpendicularly continuous with an inner peripheral edge of the support wall portion 20b.

The first lid member 21 integrally includes a first lid portion 21a formed into a rectangular dish shape and an outer tubular support portion 21b having a circular transverse cross section. The first lid portion 21a faces the support wall portion 20b of the case main body 20 from the outer side. The outer tubular support portion 21b has a base end portion perpendicularly continuous with a center portion of the first lid portion 21a in such a manner as to surround the inner tubular support portion 20c of the case main body 20. Four corners of the first lid portion 21a are fastened to one end portion of the tubular side-wall portion 20a of the case main body 20 with the screw members 23. The second lid member 22 integrally includes a second lid portion 22a formed into a rectangular plate shape and a short tubular portion 22b having a rectangular transverse cross section. The second lid portion 22a covers an opening portion on the other end of the tubular side-wall portion 20a in the case main body 20. The short tubular portion 22b is perpendicularly continuous with an outer peripheral edge portion of the second lid portion 22a in such a manner as to be fitted in the other end portion of the tubular side-wall portion 20a. The short tubular portion 22b includes guide protruding portions 25 and engagement protrusions 27 protruding from the short tubular portion 22. The guide protruding portions 25 are respectively fitted in guide slits 24 provided in the other end portion of four side walls of the tubular side-wall portion 20a. The engagement protrusions 27 are resiliently engaged respectively with a pair of engagement holes 26 provided in each of two side walls opposed to each other out of the four side walls of the tubular side-wall portion 20a.

Figure 5:
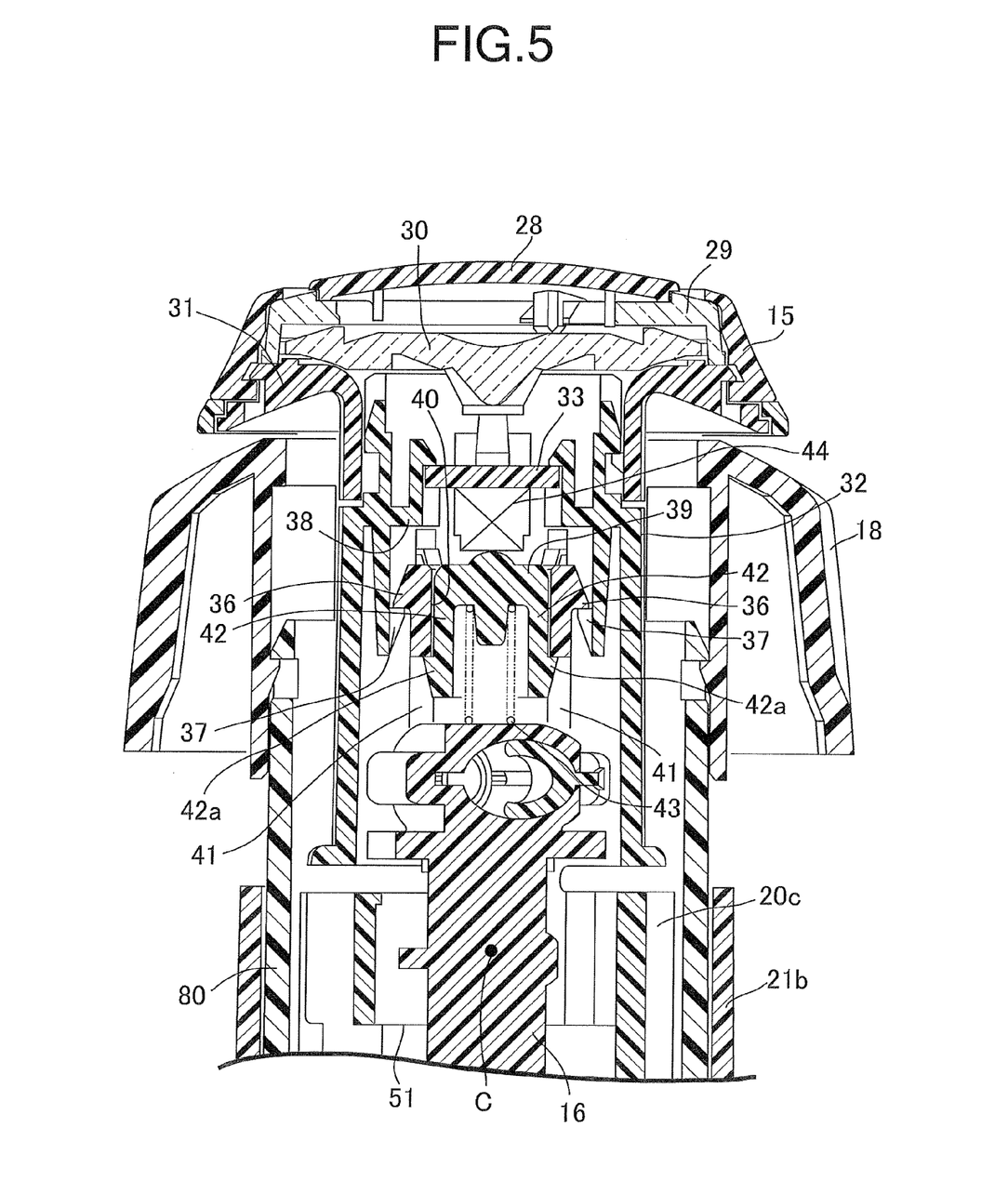
FIG. 5 is a sectional view taken along a line 5-5 in FIG. 2.

Referring to FIG. 5 together, a circular non-light-transmitting cap 28, a ring-shaped light-transmitting cap 29, a lens 30, and a ring-shaped support member 31 are attached to a center portion of the operation knob 15. The light-transmitting cap 29 is arranged around the non-light-transmitting cap 28. The lens 30 is arranged inside the caps 28 and 29. The support member 31 and the light-transmitting cap 29 sandwich a peripheral edge portion of the lens 30. One end portion of a coupling tube 32 arranged coaxially with the operation shaft 16 is joined to the support member 31. A first board 33 is fixed to the one end portion of the coupling tube 32, and a light-emitting diode 34 is provided on a surface of the first board 33 on the lens 30 side in such a manner as to be arranged inward of the lens 30.

Meanwhile, the operation shaft 16 is inserted into the inner tubular support portion 20c in such a manner that one end portion of the operation shaft 16 protrudes from the inner tubular support portion 20c of the first lid member 21. The one end portion of the operation shaft 16 protruding from the inner tubular support portion 20c is coupled to the operation knob 15 through the coupling tube 32.

The one end portion of the operation shaft 16 is inserted into the other end portion of the coupling tube 32 at a certain position set relative to the coupling tube 32 around a center axis of the operation shaft 16. In addition, the operation shaft 16 integrally includes laterally protruding claw portions 36 at two locations in a peripheral direction of the one end of the operation shaft 16. Provided on an intermediate portion of the coupling tube 32 on the operation shaft 16 side with respect to a portion in which the first board 33 is fixed are: restricting claw portions 37; and a wall portion 38 facing the one end of the operation shaft 16 from the first board 33 side. The restricting claw portions 37 are engageable with the claw portions 36 on opposite side of the claw portions 36 from the first board 33. Thus, the coupling tube 32 and the operation knob 15 are movable relative to the operation shaft 16 in the axial direction between a non-push operation position and a push operation position. The non-push operation position is a position at which the restricting claw portions 37 are in contact and engaged with the claw portions 36 of the operation shaft 16, while the push operation position is a position at which the restricting claw portions 37 are spaced away from the claw portions 36 of the operation shaft 16.

A closed-bottom insertion hole 40 and a pair of restricting holes 41 are provided in the one end portion of the operation shaft 16. The insertion hole 40 extends long in a longitudinal direction of the operation shaft 16 and allows a push rod 39, which is in contact with a surface of the first board 33 on the operation shaft 16 side, to be inserted therein. The restricting holes 41 are arranged on a diameter line of the insertion hole 40 in such a manner as to extend in the longitudinal direction of the operation shaft 16. Meanwhile, restricting arm portions 42 are integrally provided on the push rod 39 at two locations evenly spaced from each other in a peripheral direction of the push rod 39. The restricting arm portions 42 have protruding portions 42a movably inserted into the restricting holes 41 at tip ends of the restricting arm portions 42, respectively. The push rod 39 is attached to the one end portion of the operation shaft 16 in such a manner as to be movable relative to the operation shaft 16 within a range in which the protruding portions 42a are movable in the respective restricting holes 41. Moreover, a first spring 43 arranged between the push rod 39 and the operation shaft 16 is accommodated in the insertion hole 40. The push rod 39 is urged toward the first board 33 by a spring force of the first spring 43.

A switch 44 to be in contact with the push rod 39 is provided on the surface of the first board 33 on the operation shaft 16 side. When the operation knob 15 and the coupling tube 32 are pushed to be moved from the non-push operation position to the push operation position, load from the push rod 39 urged by the first spring 43 acts on the switch 44.

A first click mechanism 45 is provided between the other end portion of the coupling tube 32 and the operation shaft 16 so that an operator can feel a click at the time of pushing down the operation knob 15 and the coupling tube 32 from the non-push operation position to the push operation position.

The first click mechanism 45 includes a pair of first click pins 47, a first click spring 48, and contact surfaces 49. The first click pins 47 are respectively fitted to opposite ends of a first accommodation hole 46 provided in the operation shaft 16 such that an axis of the first accommodation hole 46 is arranged on a diameter line of the coupling tube 32. The first click spring 48 is provided between the first click pins 47 and 47 and accommodated in the first accommodation hole 46 in such a manner as to urge the first click pins 47 in a direction of protruding from an outer periphery of the operation shaft 16. The contact surfaces 49 are formed in an inner surface of the coupling tube 32 in such a manner that the first click pins 47 are in contact with the contact surfaces 49. The contact surfaces 49 are formed so that the first click pins 47 are pushed into the first accommodation hole 46 against a spring force of the first click spring 48 when the operation knob 15 and the coupling tube 32 are pushed down from the non-push operation position to the push operation position.

The operation shaft 16 is tiltably supported by the inner tubular support portion 20c of the case main body 20 in the case 17 with a tilting support member 51 placed therebetween. The tilting support member 51 is formed into a ring shape in such a manner as to surround the operation shaft 16, and is inserted into the inner tubular support portion 20c.

The operation shaft 16 is provided with a pair of first support shafts 52 protruding from the outer periphery of the operation shaft 16 in a direction of the diameter line of the operation shaft 16. The first support shafts 52 are rotatably supported by a pair of first support holes 53 provided in the tilting support member 51. The tilting support member 51 is provided with a pair of second support shafts 54 protruding from an outer periphery of the tilting support member 51 in a direction orthogonal to the axis of the first support shafts 52 and the axis of the operation shaft 16. The second support shafts 54 are rotatably supported by a pair of second support holes 55 provided in the inner tubular support portion 20c. Moreover, a pair of guide protruding portions 56 extending in parallel with the axis of the first support shafts 52 are provided on the tilting support member 51 in a protruding manner. The guide protruding portions 56 are respectively fitted in a pair of guide grooves 57 provided in an inner surface of the inner tubular support portion 20c.

Thus, the operation shaft 16 is supported by the tilting support member 51 to be rotatable about the axis of the first support shafts 52. The tilting support member 51 is supported by the inner tubular support portion 20c to be rotatable about the axis of the second support shafts 54, the axis being orthogonal to the axis of the first support shafts 52 and the axis of the operation shaft 16. Thus, the operation shaft 16 is supported by the inner tubular support portion 20c of the case 17 to be tiltable from a neutral position about a tilting center C which is a point where the axis of the first support shafts 52 and the axis of the second support shafts 54 orthogonally intersect with each other.

Focusing on FIG. 4, a magnet holder 58, a slider 59, a base 60, and a second board 61 are accommodated in the case main body 20 of the case 17 in this order from the support wall portion 20b of the case main body 20 toward the second lid portion 22a of the second lid member 22.

Thus, the second board 61 is fixed to the case 17 in such a manner as to extend along a plane including a first linear direction 62 and a second linear direction 63, the first linear direction 62 being orthogonal to the axis of the operation shaft 16 placed at the neutral position, the second linear direction 63 being orthogonal to the axis of the operation shaft 16 placed at the neutral position and to the first linear direction 62. The base 60 is fixed to the case 17 in such a manner as to face the second board 61 on the opposite side of the second board 61 from the second lid portion 22a of the second lid member 22. The second board 61 is fixed to the base 60 with multiple screw members 71.

Figure 6:
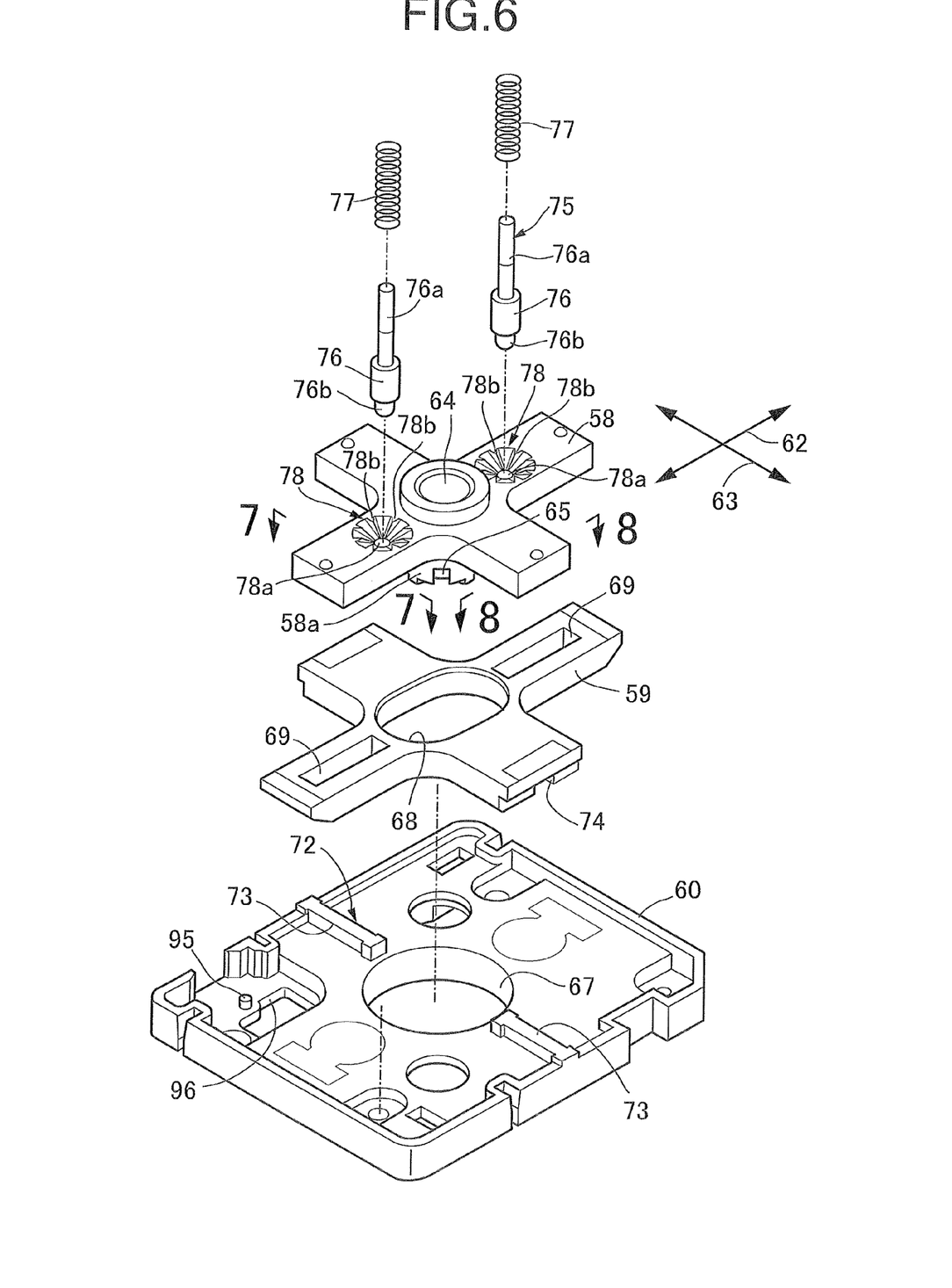
FIG. 6 is an exploded perspective view of a magnet holder, a slider and a base.
Figure 7:
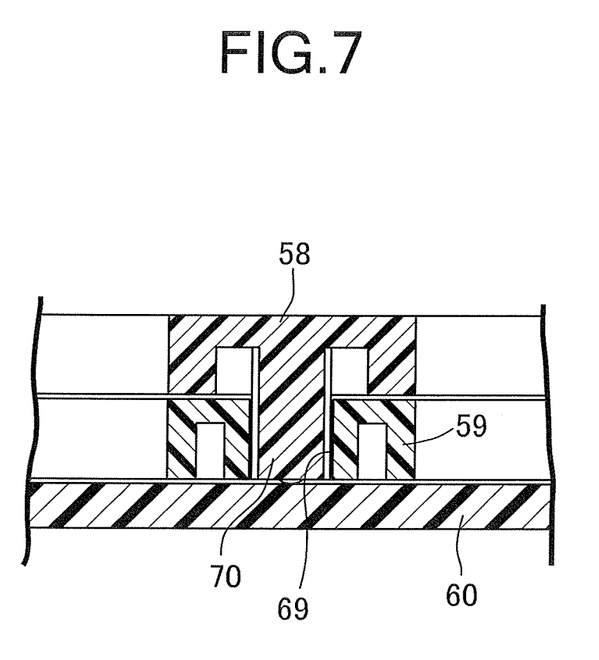
FIG. 7 is a sectional view, shown along a line 7-7 in FIG. 6, of the magnet holder, the slider and the base.

Referring to FIG. 6 together, a coupling hole 64 is provided in a center portion of the magnet holder 58 formed into a cross shape. A ball-shaped coupling portion 16a provided on the other end of the operation shaft 16 is fitted in the coupling hole 64. The other end portion of the operation shaft 16 is swingably coupled to the center portion of the magnet holder 58.

A cylindrical holding protruding portion 58a protruding toward the second board 61 is integrally provided in the center portion of the magnet holder 58. A first magnet 65 is fixed to the holding protruding portion 58a. Meanwhile, a first magnetic sensor 66 is fixed on the second board 61 in a portion where the second board 61 faces the first magnet 65. The first magnetic sensor 66 detects a tilting operation direction of the operation shaft 16 based on positional change relative to the first magnet 65 moving in accordance with the tilting of the operation shaft 16. The first magnetic sensor 66 is an IC chip formed by arranging, for example, four Hall elements at equal intervals in a peripheral direction of the first magnetic sensor 66.

The base 60 is provided with a circular first opening portion 67 which the first magnetic sensor 66 provided on the second board 61 faces. The slider 59 arranged between the magnet holder 58 and the base 60 is formed into a cross shape, and is provided with a second opening portion 68 into which the holding protruding portion 58a of the magnet holder 58 is inserted. The second opening portion 68 is formed into an elongated hole shape extending in the first linear direction 62.

The magnet holder 58 is joined to the slider 59 so that relative movement of the magnet holder 58 in the first linear direction 62 can be guided and the relative movement of the magnet holder 58 in the second linear direction 63 can be prevented.

Specifically, the slider 59 is provided with a pair of elongated holes 69 extending the first linear direction 62 in such a manner as to be located at both sides of the second opening portion 68. As explicitly shown in FIG. 7, a pair of guide protruding portions 70 provided on the magnet holder 58 are fitted in the elongated holes 69, respectively. Accordingly, the magnet holder 58 is allowed to move relative to the slider 59 in a direction in which the guide protruding portions 70 move in the elongated holes 69, that is, in the first linear direction 62, but is prevented from moving relative to the slider 59 in the second linear direction 63.

Figure 8:
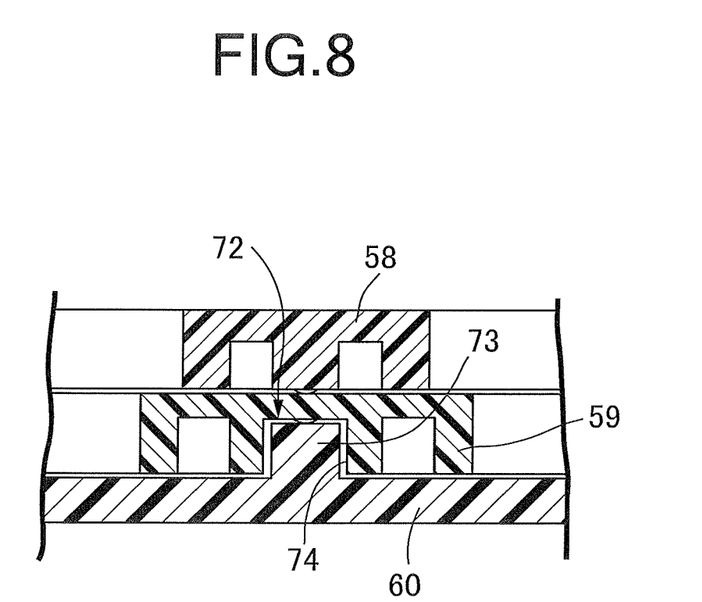
FIG. 8 is a sectional view, shown along a line 8-8 in FIG. 6, of the magnet holder, the slider and the base.

Referring to FIG. 8 together, a guide mechanism 72 configured to guide movement of the slider 59 in the second linear direction 63 is provided between the slider 59 and the base 60. The guide mechanism 72 includes: a pair of guide rails 73 provided on the base 60 in such a manner as to extend in the second linear direction 63 at opposite sides of the first opening portion 67; and a pair of guide grooves 74 provided in the slider 59 in such a manner as to allow the guide rails 73 to be fitted therein.

A second click mechanism 75 for providing a click feeling in an operation of tilting the operation shaft 16 is provided between the magnet holder 58 and the first lid member 21 of the case 17. The second click mechanism 75 includes: a pair of second click pins 76 held in the inner tubular support portion 20c of the case main body 20 so as to be movable in a longitudinal direction of the inner tubular support portion 20c; a pair of second click springs 77 which are provided between the inner tubular support portion 20c and the second click pins 76 and exert a spring force urging the second click pins 76 toward the magnet holder 58; and contact recessed portions 78 provided in the magnet holder 58 in such a manner that tip ends of the second click pins 76 are in contact with the contact recessed portions 78.

A pair of expanded portions 20d are integrally formed, in such a manner as to bulge outward, on the inner tubular support portion 20c on the first lid portion 21a side at two locations spaced from each other in a peripheral direction of the inner tubular support portion 20c. The expanded portions 20d have closed-bottom second accommodation holes 79 which extend in the longitudinal direction of the inner tubular support portion 20c and are opened on the magnet holder 58 side. The second click pins 76 integrally include shaft portions 76a movably penetrating through the closed ends of the second accommodation holes 79, and are slidably fitted in the second accommodation holes 79. Each of the coil-shaped second click springs 77 surrounding a corresponding one of the shaft portions 76a is accommodated in the corresponding second accommodation hole 79 in such a manner as to be placed between the closed end of the second accommodation hole 79 and the corresponding second click pin 76.

Each of the contact recessed portions 78 provided in the magnet holder 58 is formed to have: a neutral position contact portion 78a with which a ball-shaped contact portion 76b at a tip end of the second click pin 76 is in contact when the operation shaft 16 is placed at the neutral position where the operation shaft 16 is not tilted in any direction; and eight tilt groove portions 78b radially extending from the neutral position contact portion 78a. Each of the tilt groove portions 78b is formed in such a manner as to radially extend from a corresponding one of the neutral position contact portions 78a in eight directions including the first and second line directions 62, 63.

Thus, the movement of the magnet holder 58 in accordance with the tilting of the operation shaft 16 from the neutral position is controlled in directions of the eight tilt groove portions 78b. Climbing of the ball-shaped contact portion 76b at the tip end of the second click pin 76 along one of the tilt groove portions 78b provides a click feeling in the operation of tilting the operation shaft 16.

Meanwhile, in the second click mechanism 75, the direction of the movement of the magnet holder 58 is controlled by the tilt groove portions 78b. Shaping each contact recessed portion 78 having the tilt groove portions 78b into a cone enables a cursor to follow the movement of the operation knob 15. Thus, it is possible to apply the joystick device to a game machine using a cross operation, a toy controller of a remote control car, or the like.

Focusing on FIGS. 3 and 4 again, a rotatable cylinder 80 surrounding the inner tubular support portion 20c of the case 17 is rotatably supported by the outer tubular support portion 21b of the case 17 while being inserted into the outer tubular support portion 21b. The dial knob 18 is joined to one end of the rotatable cylinder 80.

A flange portion 80a arranged between the first lid portion 21a of the first lid member 21 and the support wall portion 20b of the case main body 20 is integrally provided on the other end of the rotatable cylinder 80. A third click mechanism 81 providing a click feeling in an operation of rotating the dial knob 18 is provided between the flange portion 80a and the support wall portion 20b.

The third click mechanism 81 includes a pair of accommodation tubular portions 82, a pair of third click pins 83, a pair of third click springs 84, and a large number of thread portions 85. The accommodation tubular portions 82 are integrally provided on the support wall portion 20b of the case main body 20 and protrude toward the flange portion 80a. The third click pins 83 are movably accommodated and held in the accommodation tubular portions 82. The third click springs 84 are provided between the support wall portion 20b and the third click pins 83 and exert a spring force to urge the third click pins 83 toward the flange portion 80a side of the rotatable cylinder 80. The thread portions 85 are formed on a surface of the flange portion 80a on the support wall portion 20b side in such a manner as that tip ends of the third click pins 83 are in contact with the thread portions 85. When the third click pins 83 climb over the thread portions 85 of the flange portion 80a, the click feeling is thereby generated.

Figure 9:
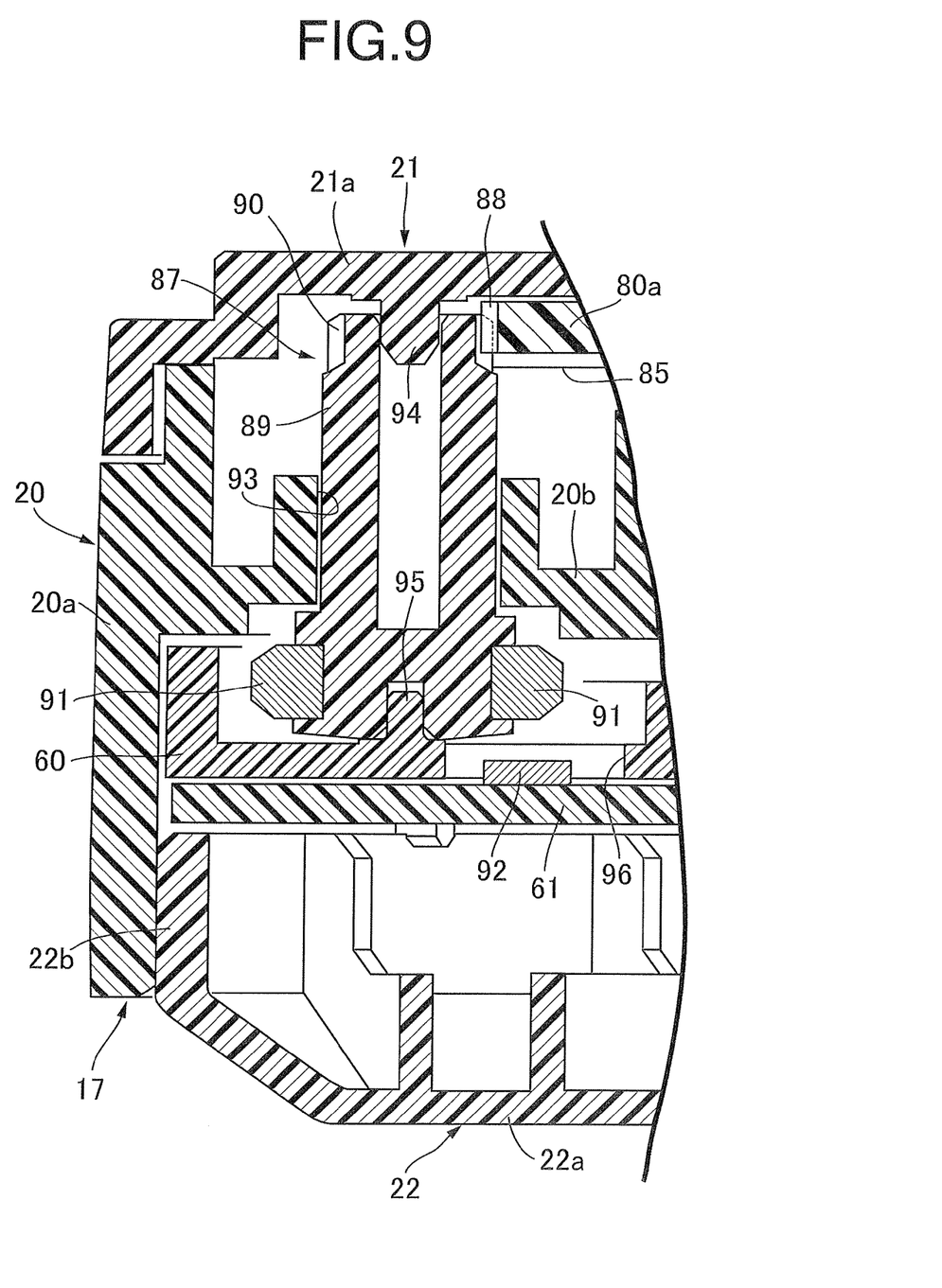
FIG. 9 is a sectional view taken along a line 9-9 in FIG. 2.

Referring to FIG. 9 together, rotation position detection means 87 for detecting a rotation position of the rotatable cylinder 80 is provided between the other end portion of the rotatable cylinder 80 and the case 17. The rotation position detection means 87 includes a drive gear 88, a rotary body 89, multiple, for example, two second magnets 91, and, for example a pair of, second magnetic sensors 92. The drive gear 88 is provided around an outer periphery of the flange portion 80a in the other end portion of the rotatable cylinder 80. The rotary body 89 is formed to have a smaller diameter than that of the rotatable cylinder 80, is rotatably supported by the case 17 at a side of the rotatable cylinder 80, and has a driven gear 90 around an outer periphery of the rotary body 89, the driven gear 90 being in mesh with the drive gear 88. The second magnets 91 are provided on the rotary body 89, spaced away from each other in a peripheral direction of the rotary body 89. The second magnetic sensors 92 are arranged in such a manner as to face the other end portion of the rotary body 89, so as to detect a rotation position of the rotatable cylinder 80 based on positional change relative to the second magnets 91 along with the rotation of the rotary body 89.

The rotary body 89 is basically formed into a cylindrical shape. The driven gear 90 is provided around an outer periphery of one end portion of the rotary body 89. The second magnets 91 are fixed around an outer periphery of the other end portion of the rotary body 89, evenly spaced away from each other in the peripheral direction of the rotary body 89.

An insertion hole 93 allowing the rotary body 89 to be inserted therein is provided in the support wall portion 20b of the case main body 20 in the case 17 in such a manner as to support a middle portion of the rotary body 89 in an axial direction thereof. A first pivotally supporting portion 94 protrudes from an inner surface of the first lid portion 21a of the first lid member 21, and is fitted in the one end portion of the rotary body 89 to pivotally support the one end portion of the rotary body 89 in a rotatable manner. In addition, a second pivotally supporting portion 95 protrudes from the base 60 fixed on the case 17, and is fitted to the other end portion of the rotary body 89 to pivotally support the other end portion of the rotary body 89 in a rotatable manner.

The second magnetic sensors 92 are, for example, Hall elements, and fixed on the second board 61 fixed on the case 17 with the base 60 placed in between. In the base 60, a third opening portion 96 is provided, allowing the second magnetic sensors 92 to face an outer periphery of the other end portion of the rotary body 89.

Figure 10:
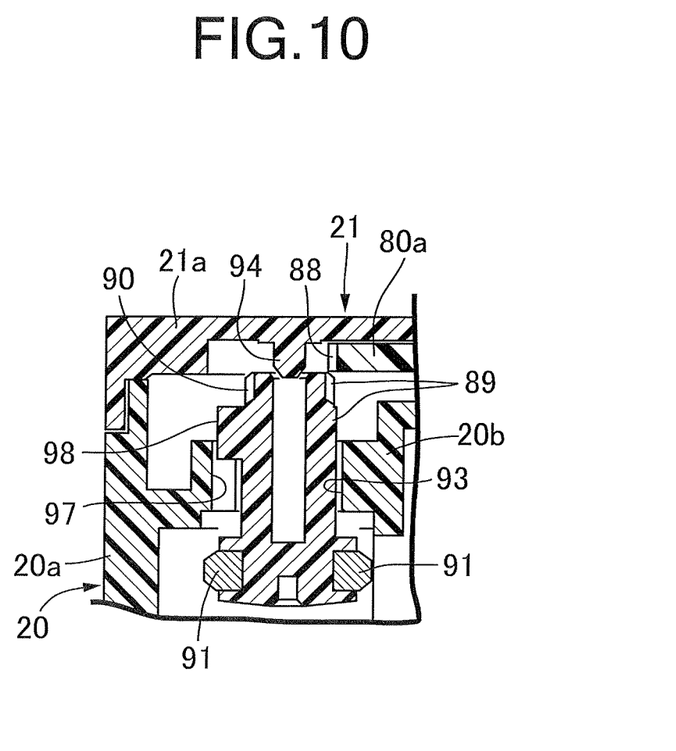
FIG. 10 is a sectional view showing a state in the course of assembling.
Figure 11:
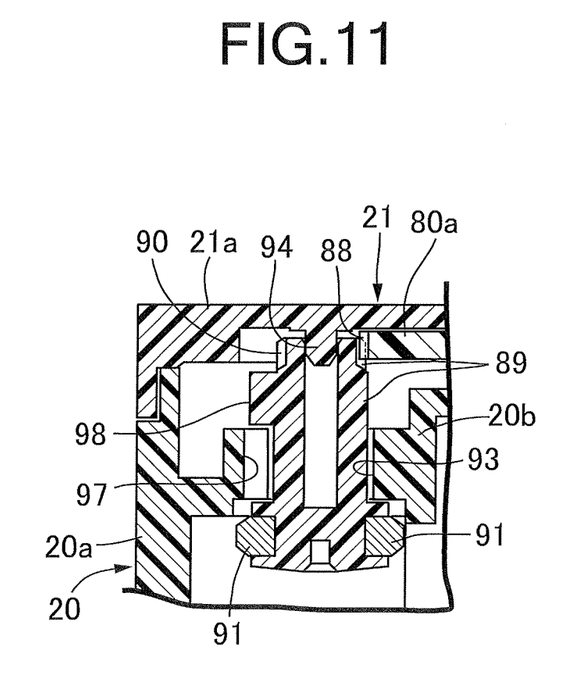
FIG. 11 is a sectional view corresponding to FIG. 10 in a state where the assembling is completed.

In FIG. 10, an engagement groove 97 extending in an axial direction of the insertion hole 93 is provided at one location in an inner periphery of the insertion hole 93. An engagement protrusion 98 protrudes from the outer periphery of the rotary body 89. The engagement protrusion 98 is engaged with the engagement groove 97 in the course of assembling at the time before the one end portion of the rotary body 89 is rotatably supported by the first pivotally supporting portion 94. However, as shown in FIG. 11, the engagement protrusion 98 is disengaged from the engagement groove 97 upon completion of the assembling where the one end portion of the rotary body 89 is rotatably supported by the first pivotally supporting portion 94 and the driven gear 90 is meshed with the drive gear 88.

Next, a description is given of operations of this embodiment. The second board 61 is fixed on the case 17 in such a manner as to extend along the plane including the first linear direction 62 and the second linear direction 63, the first linear direction 62 being orthogonal to the axis of the operation shaft 16 placed at the neutral position, the second linear direction 63 being orthogonal to the axis of the operation shaft 16 placed at the neutral position and the first linear direction 62. The base 60 is fixed on the case 17, the base 60 facing the second board 61 and including the first opening portion 67 which the first magnetic sensor 66 provided on the second board 61 faces. The first magnet 65 is fixed to the holding protruding portion 58a which is provided on the magnet holder 58 and is inserted into the first opening portion 67, the other end of the operation shaft 16 being swingably coupled to the magnet holder 58. The magnet holder 58 is coupled to the slider 59 so that the relative movement of the magnet holder 58 in the first linear direction 62 can be guided and the relative movement of the magnet holder 58 in the second linear direction 63 can be prevented, the slider 59 including the second opening portion 68 into which the holding protruding portion 58a is inserted and arranged between the magnet holder 58 and the base 60. The guide mechanism 72 configured to guide the movement of the slider 59 in the second linear direction 63 is provided between the slider 59 and the base 60. Thus, the magnet holder 58 moves along the plane parallel to the second board 61 in accordance with the tilting of the operation shaft 16, so that a distance between the first magnet 65 and the first magnetic sensor 66 can be kept constant regardless of the tilting position of the operation shaft 16. Accordingly, it is possible to prevent variation in detection accuracy in a tilting operation direction in the operation of tilting the operation shaft 16 and also possible to simplify the configuration of the circuits to thereby achieve cost reduction. In addition, preventing the variation of the detection accuracy makes it possible to control a movement amount of the cursor in very small steps (linearly) in accordance with change of a tilting amount of the operation knob 15.

Moreover, the cylindrical rotatable cylinder 80 having the one end joined to the dial knob 18 and surrounding the operation shaft 16 is supported by the case 17 to be rotatable about the axis of the rotatable cylinder 80. The rotation position detection means 87 for detecting a rotation position of the rotatable cylinder 80 is provided between the other end portion of the rotatable cylinder 80 and the case 17. The rotation position detection means 87 includes the drive gear 88, the rotary body 89, the multiple second magnets 91, and the second magnetic sensors 92. The drive gear 88 is provided around the outer periphery of the other end portion of the rotatable cylinder 80. The rotary body 89 is formed to have the smaller diameter than the rotatable cylinder 80, is rotatably supported by the case 17 at the side of the rotatable cylinder 80, and has the driven gear 90 around the outer periphery of the rotary body 89, the driven gear 90 being in mesh with the drive gear 88. The second magnets 91 are provided on the rotary body 89, spaced away from each other in the peripheral direction of the rotary body 89. The second magnetic sensors 92 are arranged on the second board 61 fixed on the case 17 in such a manner as to face the other end portion of the rotary body 89, so as to detect the rotation position of the rotatable cylinder 80 based on the positional change relative to the second magnets 91 along with the rotation of the rotary body 89. This configuration makes it possible to enhance the degree of freedom for the arrangement of the second magnetic sensors 92 in the axial direction of the rotatable cylinder 80 for the case of detecting the rotation position of the rotatable cylinder 80 by the second magnetic sensors 92 and to reduce the necessary number of the second magnets 91.

Further, the rotary body 89 is formed into the cylindrical shape in such a manner that the driven gear 90 is provided around the outer periphery of the one end portion of the rotary body 89 and the second magnets 91 are provided around the outer periphery of the other end portion thereof. The insertion hole 93 allowing the rotary body 89 to be rotatably inserted thereinto is provided in the support wall portion 20b of the case main body 20 forming part of the case 17. The first pivotally supporting portion 94 rotatably supporting the one end portion of the rotary body 89 is provided on the first lid member 21 which includes the outer tubular support portion 21b rotatably supporting the rotatable cylinder 80 and forms part of the case 17. The engagement groove 97 extending in the axial direction of the insertion hole 93 is provided at one location in the inner periphery of the insertion hole 93. The engagement protrusion 98 protrudes from the outer periphery of the rotary body 89, the engagement protrusion 98 being engaged with the engagement groove 97 in the course of assembling at the time before the one end portion of the rotary body 89 is rotatably supported by the first pivotally supporting portion 94, but being disengaged from the engagement groove 97 upon completion of the assembling where the one end portion of the rotary body 89 is rotatably supported by the first pivotally supporting portion 94 and the driven gear 90 is meshed with the drive gear 88. This configuration makes it possible to ensure positioning of the rotary body 89 with respect to the second magnetic sensors 92, so that the rotary body 89 can be assembled to the case 17. Accordingly, it is possible to prevent erroneous assembling while reducing assembling man-hours.

An embodiment of the present invention has been heretofore described above. However, the present invention is not limited to the aforementioned embodiment, and various design modifications can be made without departing from the gist of the present invention.

For example, in the aforementioned embodiment, the description has been given of the joystick device used for operating the cursor on the screen of a car navigation system. However, the present invention can be implemented widely for a joystick device configured to detect a direction of a tilting operation using an operation knob. For example, the joystick device of the present invention can be used as a controller of an electric wheel chair. In this case, with an operation of tilting the operation knob, a forward, rear, right or left direction can be designated. If a dial knob is provided, a rotation direction of the wheel chair can be designated by operating the dial knob. Moreover, the present invention can be implemented as a controller of heavy equipment such as a hydraulic excavator.

What is claimed is:

1. A joystick device comprising: an operation knob; an operation shaft coupled to the operation knob on one end thereof; a case supporting the operation shaft while allowing the operation shaft to tilt from a neutral position about a tilting center set on an axis of the operation shaft; a magnetic sensor provided on a board fixed to the case; a magnet arranged to face the magnetic sensor in such a manner as to move in accordance with the tilting of the operation shaft, in which a tilting operation direction of the operation shaft is detected based on positional change of the magnet relative to the magnetic sensor, wherein the board is fixed to the case in such a manner as to extend along a plane including a first linear direction and a second linear direction, the first linear direction being orthogonal to an axis of the operation shaft placed at the neutral position, the second linear direction being orthogonal to the axis of the operation shaft placed at the neutral position and to the first linear direction, a base is fixed to the case, the base facing the board and including a first opening portion which the magnetic sensor provided on the board faces, the magnet is fixed to a holding protruding portion which is provided on a magnet holder and is inserted into the first opening portion, the other end of the operation shaft being swingably coupled to the magnet holder, a slider is arranged between the magnet holder and the base, the slider including a second opening portion into which the holding protruding portion is inserted, the magnet holder is joined to the slider such that the slider guides relative movement of the magnet holder in the first linear direction but prevents relative movement of the magnet holder in the second linear direction, and a guide mechanism configured to guide a movement of the slider in the second linear direction is provided between the slider and the base.

\* \* \* \* \*